US008489497B1

(12) United States Patent
Novak et al.

(10) Patent No.: US 8,489,497 B1
(45) Date of Patent: Jul. 16, 2013

(54) ONLINE INTERACTIVE AND PARTNER-ENHANCED CREDIT CARD

(75) Inventors: Christopher S. Novak, Newark, NJ (US); Michael D'Angelo, Montville, NJ (US); Tom Giancola, Kennett Square, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1480 days.

(21) Appl. No.: 11/275,777

(22) Filed: Jan. 27, 2006

(51) Int. Cl.
*G06Q 40/02* (2012.01)
(52) U.S. Cl.
USPC .................................. 705/38; 705/39; 705/44
(58) Field of Classification Search
USPC .......................................... 705/41, 38, 39, 44
See application file for complete search history.

(56) References Cited

U.S. PATENT DOCUMENTS

| | | | |
|---|---|---|---|
| 3,316,395 A | 4/1967 | Lavin | |
| 3,634,669 A | 1/1972 | Soumas et al. | |
| 4,254,474 A | 3/1981 | Cooper et al. | |
| 4,594,663 A * | 6/1986 | Nagata et al. | 705/17 |
| 4,598,367 A | 7/1986 | DeFrancesco et al. | |
| 4,642,768 A | 2/1987 | Roberts | |
| 4,736,294 A | 4/1988 | Le Grand et al. | |
| 4,739,478 A | 4/1988 | Roberts et al. | |
| 4,760,604 A | 7/1988 | Cooper | |
| 4,812,628 A | 3/1989 | Boston | |
| 4,831,526 A | 5/1989 | Luchs | |
| 4,866,634 A | 9/1989 | Reboh | |
| 4,897,811 A | 1/1990 | Scofield | |
| 4,914,587 A | 4/1990 | Clouse | |
| 4,964,043 A | 10/1990 | Galvin | |
| 5,054,096 A | 10/1991 | Beizer | |
| 5,206,803 A | 4/1993 | Vitagliano | |
| 5,220,500 A | 6/1993 | Baird | |
| 5,227,874 A | 7/1993 | Von Kohorn | |
| 5,231,571 A | 7/1993 | D'Agostino | |

(Continued)

FOREIGN PATENT DOCUMENTS

| | | |
|---|---|---|
| WO | WO 96/22576 | 7/1996 |
| WO | WO 02/03226 | 1/2002 |

OTHER PUBLICATIONS

Raines Calls for Open System with Lender Access with Multiple Automated Underwriting Systems; Pledges to Waive DU Fees on Market Expansion Products; Announces Partnership with MBA on Technology, Lender Profitability Issues, Business Editors, Business Wire, New York, pp. 1-3, Apr. 19, 1999.

(Continued)

*Primary Examiner* — Thomas Dixon
*Assistant Examiner* — Gerald Vizvary
(74) *Attorney, Agent, or Firm* — Hunton & Williams LLP

(57) ABSTRACT

An on-line interactive and partner-enhanced credit card application system is disclosed. The system utilizes partner-supplied data of an applicant in credit decision. The system structures an on-line credit card application interactively with a tree-type series of questions and answers such that the next set of questions are based on the answers given. The system offers an appropriate bounty to a partner by the credit card issuer based on the data supplied by the partner and obtained during the interactive questions and answers. The system enables a credit card issuer to make an optimum product offer such as pricing and credit line assignment. The system offers commercial incentives, and utilizes the partner-supplied data during a statement process to generate further revenue and ensure cardholder retention.

25 Claims, 10 Drawing Sheets

U.S. PATENT DOCUMENTS

| | | | |
|---|---|---|---|
| 5,239,462 A | 8/1993 | Jones | |
| 5,262,941 A | 11/1993 | Saladin | |
| 5,274,547 A | 12/1993 | Zoffel | |
| 5,278,751 A | 1/1994 | Adiano | |
| 5,321,841 A | 6/1994 | East | |
| 5,424,938 A | 6/1995 | Wagner | |
| 5,444,844 A | 8/1995 | Inoue | |
| 5,481,647 A | 1/1996 | Brody | |
| 5,523,942 A | 6/1996 | Tyler et al. | |
| 5,537,315 A | 7/1996 | Mitcham | |
| 5,550,734 A | 8/1996 | Tater | |
| 5,551,021 A | 8/1996 | Harada | |
| 5,606,496 A | 2/1997 | D'Agostino | |
| 5,611,052 A | 3/1997 | Dykstra | |
| 5,644,493 A | 7/1997 | Motai | |
| 5,649,116 A | 7/1997 | McCoy | |
| 5,655,085 A | 8/1997 | Ryan | |
| 5,664,115 A | 9/1997 | Fraser | |
| 5,689,649 A | 11/1997 | Altman et al. | |
| 5,696,907 A | 12/1997 | Tom | |
| 5,699,527 A * | 12/1997 | Davidson | 705/38 |
| 5,701,400 A | 12/1997 | Amado | |
| 5,715,402 A | 2/1998 | Popolo | |
| 5,717,865 A | 2/1998 | Stratmann | |
| 5,732,397 A | 3/1998 | DeTore | |
| 5,742,775 A | 4/1998 | King | |
| 5,758,328 A | 5/1998 | Giovannoli | |
| 5,765,144 A | 6/1998 | Larche | |
| 5,774,882 A | 6/1998 | Keen | |
| 5,774,883 A | 6/1998 | Andersen et al. | |
| 5,794,207 A | 8/1998 | Walker | |
| 5,797,133 A * | 8/1998 | Jones et al. | 705/38 |
| 5,802,502 A | 9/1998 | Gell | |
| 5,809,478 A | 9/1998 | Greco | |
| 5,815,683 A | 9/1998 | Vogler | |
| 5,832,447 A | 11/1998 | Rieker | |
| 5,838,906 A | 11/1998 | Doyle | |
| 5,842,178 A | 11/1998 | Giovannoli | |
| 5,844,553 A | 12/1998 | Hao | |
| 5,845,256 A | 12/1998 | Pescitelli | |
| 5,848,427 A | 12/1998 | Hyodo | |
| 5,862,223 A | 1/1999 | Walker | |
| 5,870,721 A | 2/1999 | Norris | |
| 5,870,723 A | 2/1999 | Pare | |
| 5,873,096 A | 2/1999 | Lim | |
| 5,875,437 A | 2/1999 | Atkins | |
| 5,878,403 A | 3/1999 | Agrawal et al. | |
| 5,883,810 A * | 3/1999 | Franklin et al. | 700/232 |
| 5,897,621 A | 4/1999 | Boesch et al. | |
| 5,899,982 A | 5/1999 | Randle | |
| 5,910,988 A | 6/1999 | Ballard | |
| 5,911,135 A | 6/1999 | Atkins | |
| 5,913,202 A | 6/1999 | Motoyama | |
| 5,918,217 A | 6/1999 | Maggioncalda | |
| 5,920,848 A | 7/1999 | Schutzer | |
| 5,926,800 A | 7/1999 | Baronowski et al. | |
| 5,930,764 A | 7/1999 | Melchione | |
| 5,930,775 A | 7/1999 | McCauley | |
| 5,930,776 A * | 7/1999 | Dykstra et al. | 705/38 |
| 5,940,811 A * | 8/1999 | Norris | 705/38 |
| 5,940,812 A | 8/1999 | Tengel et al. | |
| 5,953,710 A * | 9/1999 | Fleming | 705/38 |
| 5,963,953 A | 10/1999 | Cram et al. | |
| 5,966,699 A * | 10/1999 | Zandi | 705/38 |
| 5,970,482 A * | 10/1999 | Pham et al. | 706/16 |
| 5,970,483 A | 10/1999 | Evans | |
| 5,983,206 A | 11/1999 | Oppenheimer | |
| 5,987,434 A | 11/1999 | Libman | |
| 5,987,436 A | 11/1999 | Halbrook | |
| 5,991,750 A | 11/1999 | Watson | |
| 5,995,947 A | 11/1999 | Fraser | |
| 5,999,908 A * | 12/1999 | Abelow | 705/1 |
| 6,012,044 A | 1/2000 | Maggioncalda et al. | |
| 6,014,645 A | 1/2000 | Cunningham | |
| 6,014,646 A | 1/2000 | Vallee et al. | |
| 6,029,149 A | 2/2000 | Dykstra | |
| 6,032,137 A | 2/2000 | Hallard | |
| 6,055,517 A | 4/2000 | Friend et al. | |
| 6,078,905 A | 6/2000 | Pich-LeWinter | |
| 6,088,686 A | 7/2000 | Walker et al. | |
| 6,105,007 A | 8/2000 | Norris | |
| 6,108,644 A | 8/2000 | Goldschlag et al. | |
| 6,112,190 A | 8/2000 | Fletcher et al. | |
| 6,128,603 A | 10/2000 | Dent et al. | |
| 6,134,530 A | 10/2000 | Bunting et al. | |
| 6,144,948 A * | 11/2000 | Walker et al. | 705/38 |
| 6,167,383 A | 12/2000 | Henson | |
| 6,185,543 B1 | 2/2001 | Galperin et al. | |
| 6,202,053 B1 | 3/2001 | Christiansen et al. | |
| 6,208,979 B1 | 3/2001 | Sinclair | |
| 6,216,115 B1 | 4/2001 | Barrameda et al. | |
| 6,233,566 B1 | 5/2001 | Levine et al. | |
| 6,249,775 B1 | 6/2001 | Freeman et al. | |
| 6,260,026 B1 | 7/2001 | Tomida et al. | |
| 6,272,528 B1 | 8/2001 | Cullen et al. | |
| 6,292,786 B1 * | 9/2001 | Deaton et al. | 705/14 |
| 6,311,169 B2 | 10/2001 | Duhon | |
| 6,324,524 B1 * | 11/2001 | Lent et al. | 705/38 |
| 6,339,766 B1 | 1/2002 | Gephart | |
| 6,343,279 B1 | 1/2002 | Bissonette et al. | |
| 6,374,230 B1 | 4/2002 | Walker et al. | |
| 6,385,594 B1 | 5/2002 | Lebda et al. | |
| 6,405,181 B2 | 6/2002 | Lent et al. | |
| 6,422,462 B1 | 7/2002 | Cohen | |
| 6,477,509 B1 * | 11/2002 | Hammons et al. | 705/26.8 |
| 6,502,080 B1 | 12/2002 | Eichorst et al. | |
| 6,505,176 B2 | 1/2003 | DeFrancesco, Jr. et al. | |
| 6,529,187 B1 | 3/2003 | Dickelman | |
| 6,556,979 B1 | 4/2003 | Liu et al. | |
| 6,567,791 B2 | 5/2003 | Lent et al. | |
| 6,578,761 B1 | 6/2003 | Spector | |
| 6,587,841 B1 | 7/2003 | DeFrancesco et al. | |
| 6,601,034 B1 | 7/2003 | Honarvar et al. | |
| 6,739,506 B1 * | 5/2004 | Constantine | 235/380 |
| 6,805,287 B2 | 10/2004 | Bishop | |
| 6,817,521 B1 * | 11/2004 | Matada | 235/380 |
| 6,839,680 B1 * | 1/2005 | Liu et al. | 705/10 |
| 6,865,547 B1 * | 3/2005 | Brake et al. | 705/41 |
| 6,877,656 B1 * | 4/2005 | Jaros et al. | 235/380 |
| 2001/0011255 A1 | 8/2001 | Asay et al. | |
| 2001/0037289 A1 | 11/2001 | Mayr et al. | |
| 2001/0047313 A1 | 11/2001 | Kanai | |
| 2001/0047489 A1 | 11/2001 | Ito et al. | |
| 2002/0007341 A1 * | 1/2002 | Lent et al. | 705/38 |
| 2002/0013728 A1 | 1/2002 | Wilkman | |
| 2002/0026410 A1 * | 2/2002 | Woloshin et al. | 705/38 |
| 2002/0032645 A1 | 3/2002 | Nozaki et al. | |
| 2002/0038363 A1 | 3/2002 | MacLean | |
| 2002/0048369 A1 | 4/2002 | Ginter et al. | |
| 2002/0052833 A1 | 5/2002 | Lent et al. | |
| 2002/0052836 A1 | 5/2002 | Galperin et al. | |
| 2002/0052842 A1 | 5/2002 | Schuba et al. | |
| 2002/0062285 A1 | 5/2002 | Amann et al. | |
| 2002/0069159 A1 | 6/2002 | Talbot et al. | |
| 2002/0087468 A1 | 7/2002 | Ganesan et al. | |
| 2002/0091628 A1 * | 7/2002 | Kunimatsu | 705/38 |
| 2002/0091635 A1 | 7/2002 | Dilip et al. | |
| 2002/0103749 A1 | 8/2002 | Agudo et al. | |
| 2002/0116257 A1 * | 8/2002 | Helbig | 705/14 |
| 2002/0123960 A1 * | 9/2002 | Ericksen | 705/38 |
| 2002/0188556 A1 | 12/2002 | Colica et al. | |
| 2003/0004866 A1 | 1/2003 | Huennekens et al. | |
| 2003/0028451 A1 * | 2/2003 | Ananian | 705/27 |
| 2003/0046222 A1 | 3/2003 | Bard et al. | |
| 2003/0046223 A1 | 3/2003 | Crawford et al. | |
| 2003/0101133 A1 | 5/2003 | DeFrancesco, Jr. et al. | |
| 2003/0120586 A1 | 6/2003 | Litty | |
| 2003/0135448 A1 | 7/2003 | Aguias et al. | |
| 2003/0135449 A1 | 7/2003 | Xu et al. | |
| 2003/0135450 A1 | 7/2003 | Aguais et al. | |
| 2003/0140000 A1 | 7/2003 | Lee | |
| 2003/0176931 A1 | 9/2003 | Pednault et al. | |
| 2003/0195840 A1 | 10/2003 | Xu | |
| 2003/0229582 A1 | 12/2003 | Sherman et al. | |
| 2004/0030637 A1 * | 2/2004 | Robison et al. | 705/38 |
| 2004/0044615 A1 | 3/2004 | Xue et al. | |
| 2004/0078276 A1 * | 4/2004 | Shimogori | 705/26 |

| | | | | |
|---|---|---|---|---|
| 2004/0111359 | A1* | 6/2004 | Hudock | 705/38 |
| 2005/0097036 | A1* | 5/2005 | White et al. | 705/39 |
| 2005/0288954 | A1* | 12/2005 | McCarthy et al. | 705/1 |
| 2008/0255986 | A1* | 10/2008 | Scarborough et al. | 705/38 |

OTHER PUBLICATIONS

Hickman et al., An Evolutionary Leap in Credit Portfolio Risk Modeling, Dec. 18, 2002.

Automated Capture for Forms & Documents, Cardiff Teleform Elite, copyright 1991-2000.

Car Loans in Minutes, Bank Management, vol. 64, No. 4, Apr. 1, 1993.

Credit Line Optimization, A Marketswitch Paper, Marketswitch Corporation, www.marketswitch.com, copyright 2002, 6 pages.

Credit Score Accuracy and Implications for Consumers, Consumer Federation of America National Credit Rep, Dec. 17, 2002.

Fast Start Scoring Models, Scorex, http://www.scorex.com/us/home.html, copyright 2003, Jun. 25, 2005.

Banasiak, Integrating Predictive Scoring Technology, 12th Annual Credit Card Collections Conference; Oct. 15, 2003-Oct. 17, 2003.

NAESB-SUIS Creditworthiness Principles Draft #1, NAESB-SUIS, Dec. 9, 2002.

Hubbard et al., NextGen FICO Scores: More Predictive Power in Account Management, A Fair Isaac Paper, Sep. 1, 2001.

Scorex Launches New Credit Line Optimization Consulting Service, Scorex, Press Release, Oct. 27, 2003.

Strategy Science Executive Brief, Fair Isaac, copyright Jun. 2003, Jun. 1, 2003.

Rusnak, Raymond, Subprime Auto Finance, What's the Fuss?, What's the Future, A Credit Perspective, The Journal of Lending & Credit Risk Management, pp. I 23-30, Apr. 1997.

TRIAD Adaptive Control System—Version 7, Fair Isaac, copyright 2003, Jun. 25, 2005.

Paradi et al., Using DEA and Negative DEA in Credit Risk Evaluation, Journal of Productivity Analysis, vol. 21, 2004, pp. 153-165.

* cited by examiner

What is your average monthly rent or mortgage payment?
  Less than $400
  $400 - $1,000
  Greater $1,000
  I do not pay any rent or mortgage Did you have balance transfers with other credit card issuers in the past 12 months?
  I do not have any balance transfer with other credit card issuers
  I have less than 3 balance transfers with other credit card issuers in the past 12 months.
  I have 3 – 6 balance transfers with other credit card issuers in the past 12 months.
  I have more than 6 balance transfers with other credit card issuers in the past 12 months.

What are your average utility bills (i.e., gas and electric, home phone bills, cell phone cells…)?
  Less than $50
  $50 - $100
  More than $100
  I do not have to pay any utility bills.

Do you currently own, finance or lease one or more cars?
  I currently own one or more cars.
  I currently finance one or more cars.
  I currently lease one or more cars.
  I currently own, finance or lease one or more cars.
  I do not own or finance or lease any car.

Which one of the following is your preferred transaction with your retail bank?
  Most of my banking transactions are made through online banking.
  Most of my banking transactions are made in person at the bank or ATM.
  I do not have any retail bank accounts.

Which one of the following best describes the reasons you apply for the Chase credit card offer?
  No annual fee
  Low interest APR
  Balance transfer offer
  Customer services
  Online functionality

- Which one of the following best described the type of purchases with Amazon in the past 12 months?
  - ☐ Most of my purchases are book, electronic, toy and game related items
  - ☐ Most of my purchases are apparel related items
  - ☐ Most of my purchases are houseware, tool and hardware items
  - ☐ I have not bought any merchandise with Amazon
- How often do you plan to order from Amazon in the next 12 months?
  - ☐ Between 1 – 3 orders
  - ☐ Between 4 – 6 orders
  - ☐ More than 6 orders
  - ☐ I do have any plan to buy additional merchandise from Amazon.
- What is your total purchase amount with Amazon in the past 12 months?
  - ☐ My total purchase amount with Amazon is less than $100.
  - ☐ My total purchase amount with Amazon is between $100 and $500.
  - ☐ My total purchase amount with Amazon is greater than $500.
  - ☐ I have not bought any merchandise with Amazon.
- Do you want to be included in our mailing list on upcoming events and special promotions?
  - ☐ Yes, please include me in the mailing list.
  - ☐ No, please do not include me in the mailing list.

Figure 5A

- Please check one of the following about your Disney purchases in the past 12 months:
  ☐ I purchased most of my Disney products via the online Disney store
  ☐ I purchased most of my Disney products via in person at a Disney store or at a Disney theme park
  ☐ I have not made any purchases with Disney in the past 12 months

- Do you have any plan to visit a Disney theme park?
  ☐ I plan to visit a Disney theme park within the next 12 months
  ☐ I plan to visit a Disney theme park within the next 12- 24 months
  ☐ I do not have any plans yet to visit a Disney theme park
  ☐ I do not plan to visit a Disney theme park

- How many times have you visited a Disney theme park in the past 3 years?
  ☐ Between 1 and 3 times
  ☐ 3 – 6 times
  ☐ more than 6 times
  ☐ I have never visited a Disney theme park

- Do you want to be included in our mailing list on upcoming events and special promotions?
  ☐ Yes, please include me in the mailing list.
  ☐ No, please do not include me in the mailing list.

Figure 5B

ONLINE INTERACTIVE AND PARTNER-ENHANCED CREDIT CARD

RELATED APPLICATIONS

U.S. application Ser. No. 09/872,447, filed on Jun. 1, 2001, entitled "System and Method for Offering a Financial Product", is generally related by subject matter to the present application, and is herein incorporated by reference in its entirety. The following pending applications and/or issued patents are also generally related by subject matter to the present application: "System and Method for Pre-Decision Database" (Ser. No. 10/654,091; filed Sep. 4, 2003); "System and Method for Generating Graphical User Interfaces (U.S. Pat. No. 6,867,789; and Ser. No. 10/889,176 filed Jul. 13, 2004): "Method and Apparatus for Generating Segmentation Scorecards" (U.S. Pat. No. 6,202,053); "System and Method for Implementing a Consolidated Application Process" (Ser. No. 09/599,602; filed Jun. 23, 2000); and "System and Method for Establishing or Modifying an Account with User Selectable Terms" (Ser. No. 10/284,394; filed Oct. 31, 2002).

FIELD OF THE INVENTION

The present invention relates to a system which facilitates credit decision during an interactive and partner-enhanced credit card application process.

BACKGROUND OF THE INVENTION

Currently, there are two ways of applying a credit card, i.e., mail-in application and on-line application. Both methods follow a static and one-dimensional questionnaire format. An applicant fills out an application, in either the mail form or the on-line form, which consists of background questions about personal information, demographic profiles, and financial information. The application containing the answers to these questions is then submitted to a credit card issuer. The credit card issuer evaluates both the applicant-supplied information and credit bureau-supplied data about this applicant's credit history by means of an established methodology, and makes a decision about whether to approve, or decline, or further review the application. The relevant teachings could be obtained from the patents issued to Norris in the area of realtime processing of loan applications, including U.S. Pat. Nos. 5,870,721; 5,940,811; and 6,105,007.

However, these conventional credit card application methods have the following limitations. To make a credit decision, they cannot obtain enough information from the credit bureau about an applicant with a limited or even no credit history. Besides, they can not capture credit interests of an applicant (e.g., credit card seeker, or reward driven, or partner affinity) and incorporate this information into the decision process. Furthermore, they cannot reflect risks associated with an applicant from different partners.

Hence, in order to overcome these limitations and optimize the credit decision process, there is a need to establish an on-line interactive and partner-enhanced credit card application system.

SUMMARY OF THE INVENTION

Therefore, an object of the present invention is to build up an on-line interactive and partner-enhanced credit card application system to facilitate a credit decision process.

Another object of the present invention is to optimize a product offer process, e.g., pricing and credit line assignment, by means of capturing unique information about an applicant that cannot be obtained easily in the traditional non-interactive and non-partner-enhanced application.

A further object of the present invention is to improve a credit decision process such as approval rate and account mix.

Yet another object of the present invention is to get new credit card holders including those with a limited or even no credit history.

A still further object of the present invention is to generate new sources of revenue through rewards, and/or discounts. and/or advertisements.

In accordance with an aspect of the present invention, a method of facilitating credit decision in an on-line interactive and partner-enhanced credit card application process serves to utilize partner-supplied data of an applicant during credit decision by a credit card issuer.

In accordance with another aspect of the present invention, a method of facilitating credit decision in an on-line interactive and partner-enhanced credit card application process serves to structure an on-line credit card application interactively with a tree-type series of questions and answers or pop-ups such that the next set of questions are based on the answers given. These questions can also be prompted via other statistical modeling techniques such as but not limited to logistic regression, neural networks, genetic algorithms and other methods yet in place.

In accordance with a further aspect of the present invention, a method of facilitating credit decision in an on-line interactive and partner-enhanced credit card application process serves to offer an appropriate bounty to a partner by the credit card issuer based on the data supplied by the partner and obtained through the interactive questions and answers.

In accordance with a yet another aspect of the present invention, a method of facilitating credit decision during an on-line interactive and partner-enhanced credit card application process serves to enable a credit card issuer to make an optimum offer such as pricing and credit line assignment.

In accordance with a still further aspect of the present invention, a method of facilitating credit decision during an on-line interactive and partner-enhanced credit card application process serves to offer commercial incentives, and utilize the partner-supplied data during a statement process to generate further revenue and ensure cardholder retention.

The above and other objects and features of the present invention will be apparent in the following detailed description of the present invention when read in conjunction with the accompanying drawings.

BRIEF DESCRIPTION OF THE DRAWINGS

In order to facilitate a fuller understanding of the present invention, reference is now made to the accompanying drawings. These drawings should not be construed as limiting the present disclosure, but are intended to be exemplary only.

FIGS. 3A~3B are a diagram illustrating exemplary standard questions and answer choices utilized during an interactive and partner-enhanced credit card application process in accordance with one embodiment of the present invention.

FIG. 4 is a diagram illustrating exemplary components of a customer's background data in accordance with one embodiment of the present invention.

FIGS. 5A~5C are a diagram illustrating exemplary additional questions and answer choices utilized during an interactive and partner-enhanced credit card application process in accordance with one embodiment of the present invention.

DETAILED DESCRIPTION OF THE INVENTION

Figure 1:
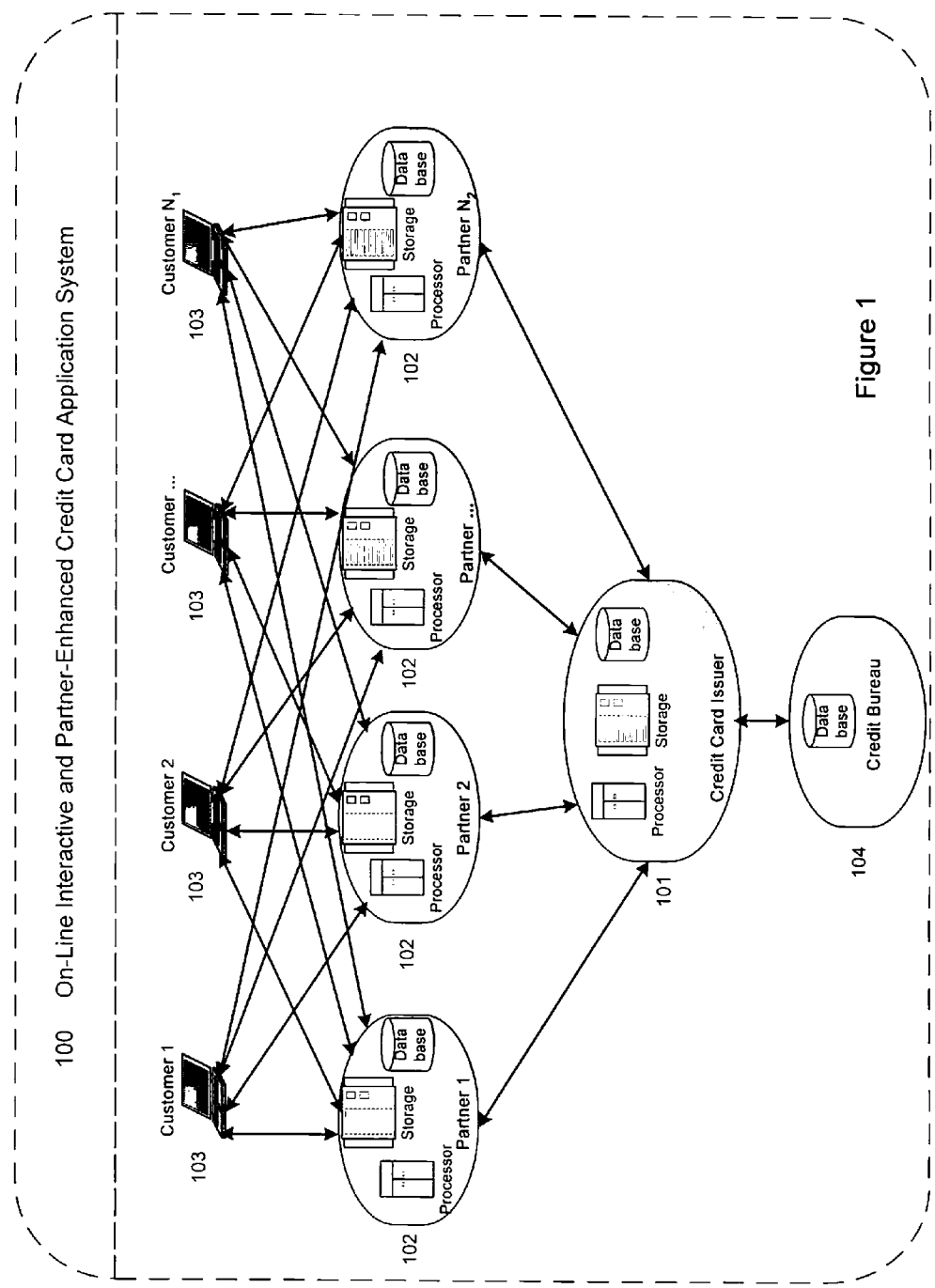
FIG. 1 is a block diagram illustrating an embodiment of an online interactive and partner-enhanced credit card application system.

FIG. 1 is a block diagram illustrating an embodiment of an online interactive and partner-enhanced credit card application system 100. The online interactive and partner-enhanced credit card application system comprises a credit card issuer 101, partners 102, customers 103, and a credit bureau 104. The credit card issuer could be any institution which can issue a credit card and offer credit card service, e.g., a bank, a financial service company, or an insurance company. The card credit issuer in the context hereafter could represent an entity which utilizes suitable software and hardware to carry out an online interactive and partner-enhanced credit card application process. The credit card issuer's partner could be any business unit which offers online commercial products or services, e.g., an online merchant such as amazon.com. or an airline, or a satellite company such as Direct TV, and which establishes a partnership relation with the credit card issuer including incorporating an interactive credit card application as one of its offered products and services, and providing history data between the partner and the applicant to the credit card issuer, e.g., the amounts of purchases, frequency of purchase, and types of purchase. The customer could be any person who can utilize internet access to make a product or service purchase by means of an internet-accessible computer. A credit bureau could be any institution which can provide credit history information of a credit card applicant, e.g., FICO score. The credit card issuer and its partners have facilities which comprise suitable hardware and software such as communication interfaces, processors, storage devices, and database configured for the online interactive and partner-enhanced credit card application. The credit card issuer could communicate with its partners and the credit bureau using a specific network system. They may also communicate with each other through a non-system avenue, such as a third party network.

It should be understood that the specific hardware and software used in the online interactive and partner-enhanced credit card application system is not critical to the present invention, and one of ordinary skills in the art will readily appreciate variations in hardware and software configurations that are suitable.

Figure 2A:
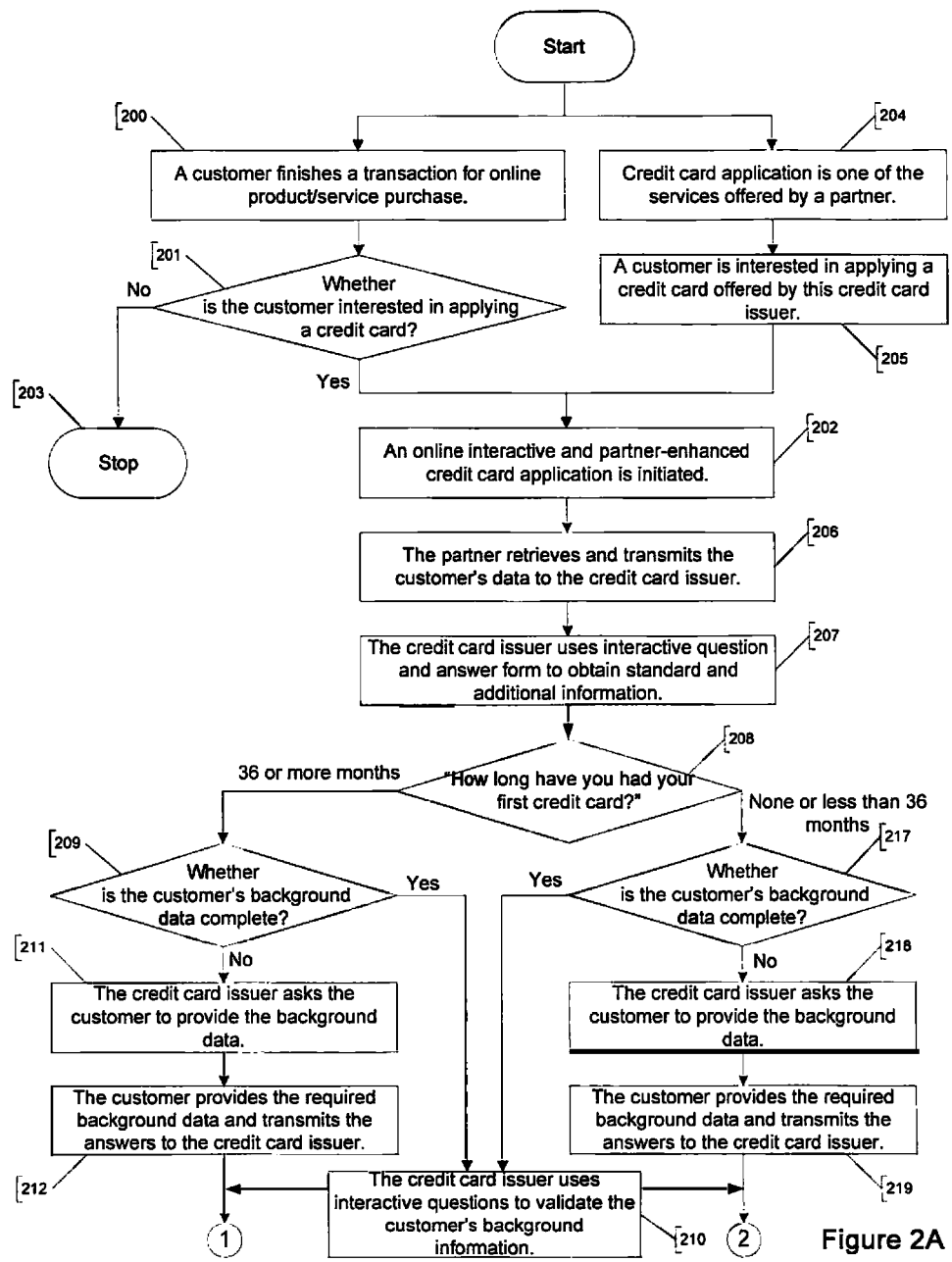
FIGS. 2A~2C are a flowchart showing an online interactive and partner-enhanced credit card application process in accordance with one embodiment of the present invention.
Figure 2B:
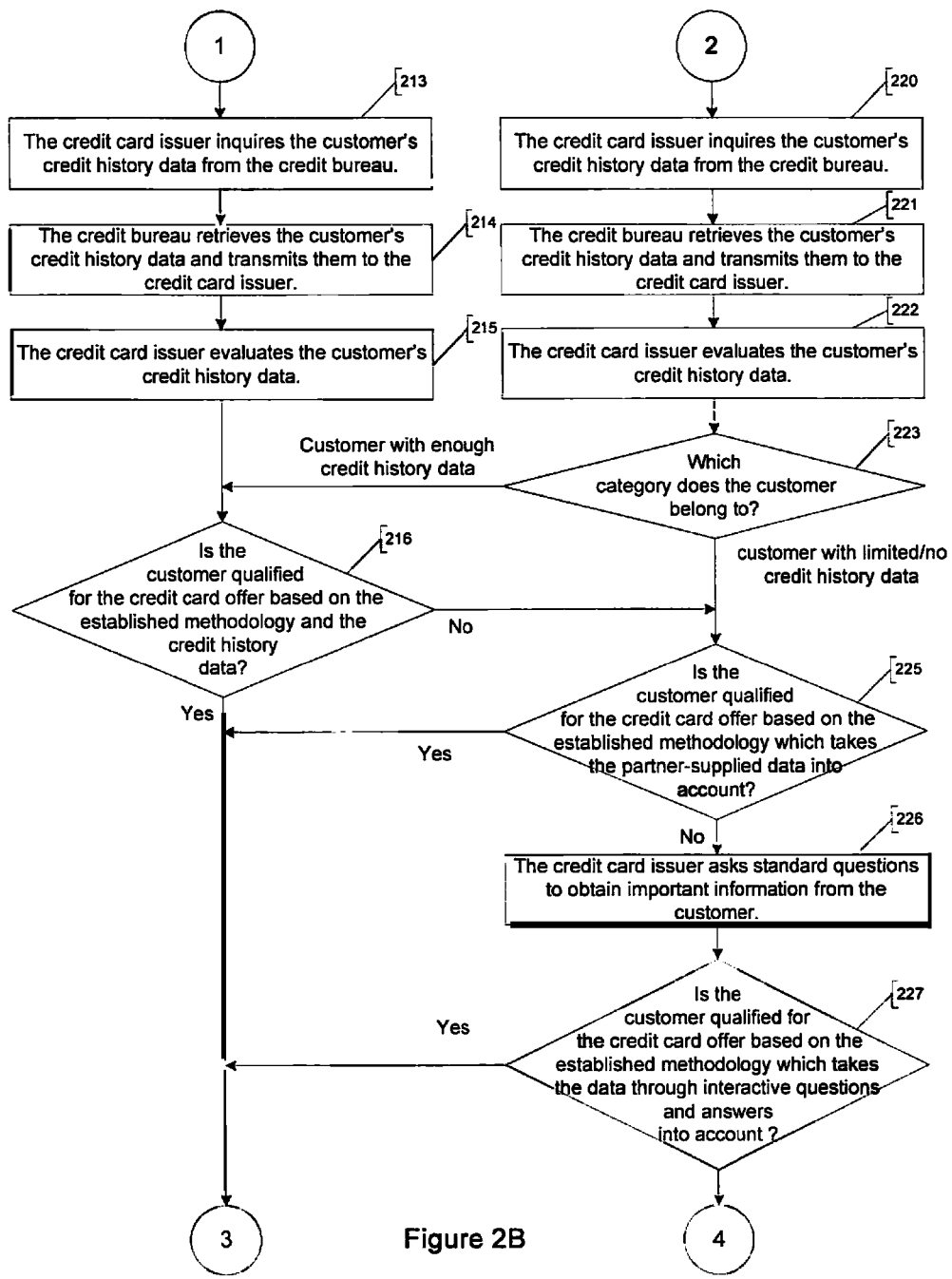
Figure 2C:
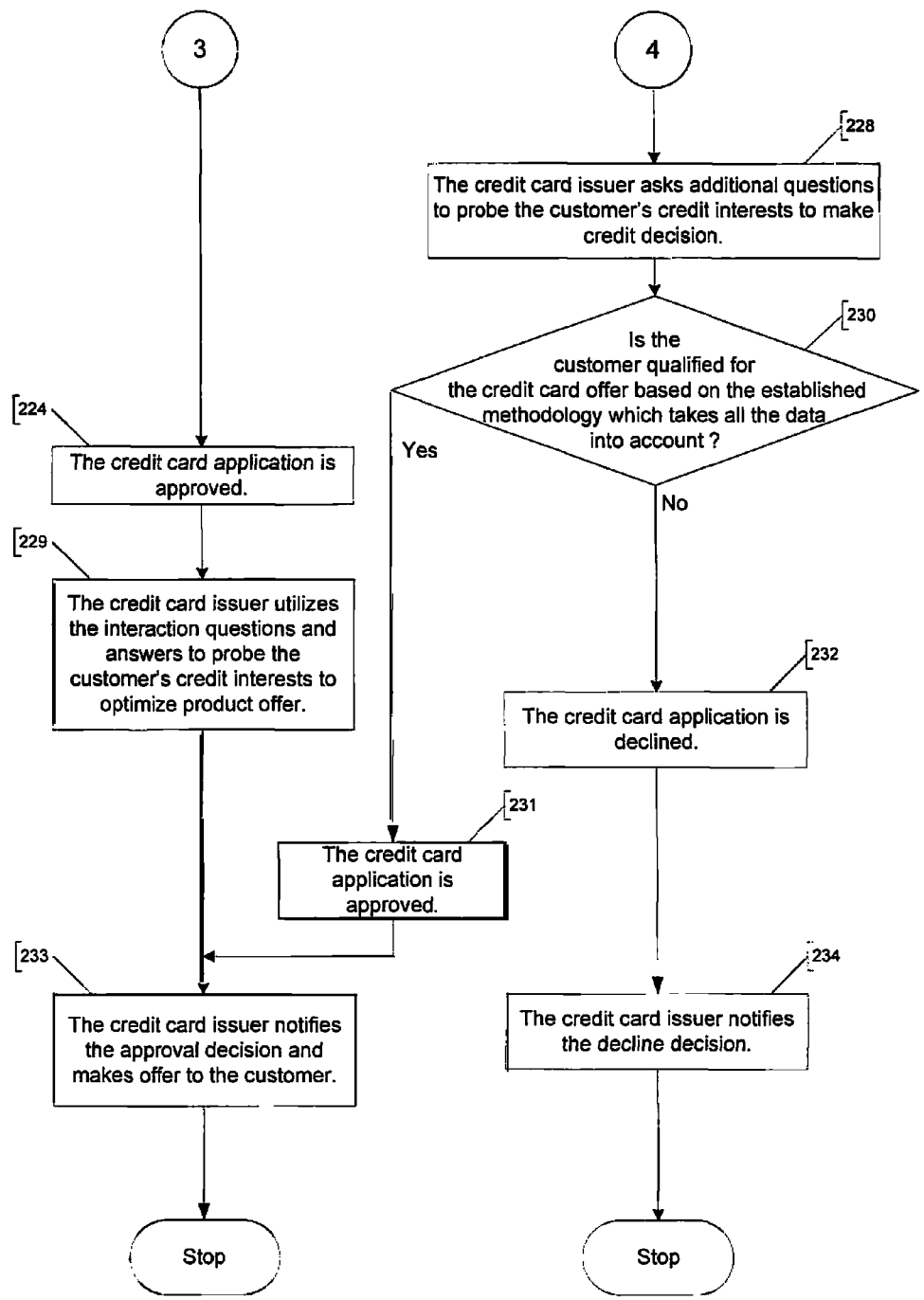

FIGS. 2A~2C are a flowchart showing an online interactive and partner-enhanced credit card application process in accordance with one embodiment of the present invention. When a customer finishes a transaction of making an online product or service purchase from a partner of a credit card issuer 200, a pop-up appears on the screen to ask whether the customer is interested in applying a credit card offered by this credit card issuer 201. This purchase can also be made through other mediums such as but not limited to POS terminals, Kiosks. Cell Phones, Pocket PC's, RFID, and future mediums in development. If the customer clicks yes, an interactive credit card application process is initiated 202. If the customer clicks no, the credit card application process is stopped 203. The customer could then either end the online session or continue to use other services on the partner's website/medium. According to another approach, the credit card application is one of the services offered by the partner of the credit card issuer 204. The customer could directly access this service at any time, or before/after making a product or service purchase 205.

When an online interactive and partner-enhanced credit card application process is initiated, the partner retrieves data about the customer from its own database including, preferably but not limited to, background data (e.g., personal information, demographic profiles, and financial information), past transaction data (e.g., amounts of purchases, frequency of purchases, and types of purchases), and/or other data (e.g., credit accounts used), and transmits these data to the credit card issuer 206. In the meantime, a real-time online session is established between the customer and the credit card issuer by means of suitable software, hardware, and interne connection. The credit card issuer utilizes interactive questions and answers to obtain the customer's background, and/or standard, and/or additional information 207.

Figure 3A:
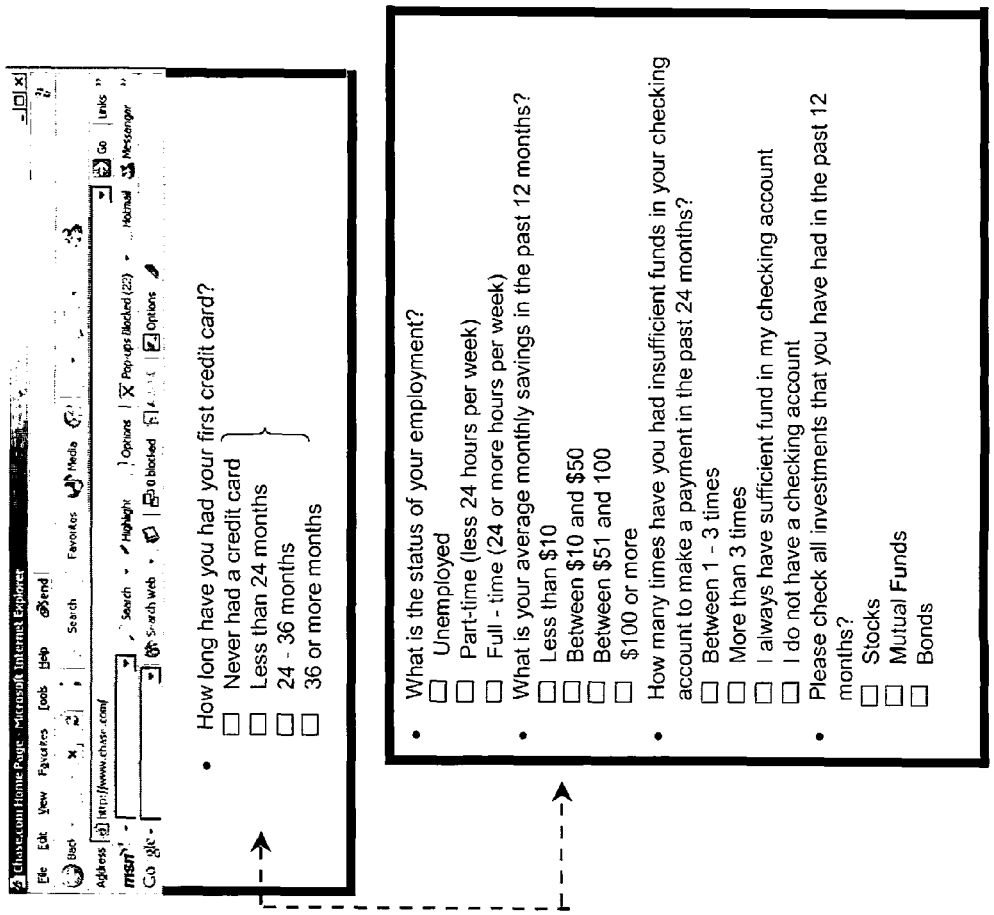

The interactive question and answer form is a dynamic process with a tree-type series of questions/answers or pop-ups such that the next set of questions are based on the answer given. FIGS. 3A~3B are a diagram illustrating exemplary standard questions and answers utilized during an interactive and partner-enhanced credit card application process in accordance with one embodiment of the present invention. The method of FIG. 2A is described in connection with FIGS. 3A~3B in order to set forth the method in a concrete fashion easily understood by the person of ordinary skills. However, this articulation of the method is exemplary only, and the method could be implemented using questions different from those of FIGS. 3A~3B.

As set forth in step 208 of FIG. 2A, a pop-up asks the customer: "How long have you had your first credit card?" The credit card issuer uses this trigger question to determine if additional questions are needed based on the answer from the customer. If the selection the customer picks up is: "36 or more months", the credit card issuer will check whether the customer's background data from the partner is complete 209. If yes, the credit card issuer will use interactive questions and answers to ask the customer his/her background information, compare the partner-supplied data with the customer-supplied data, and thus validate the customer's background information 210. If the customer's background data from the partner is not complete, a pop-up will appear to ask the customer to provide the background data 211.

Figure 4:
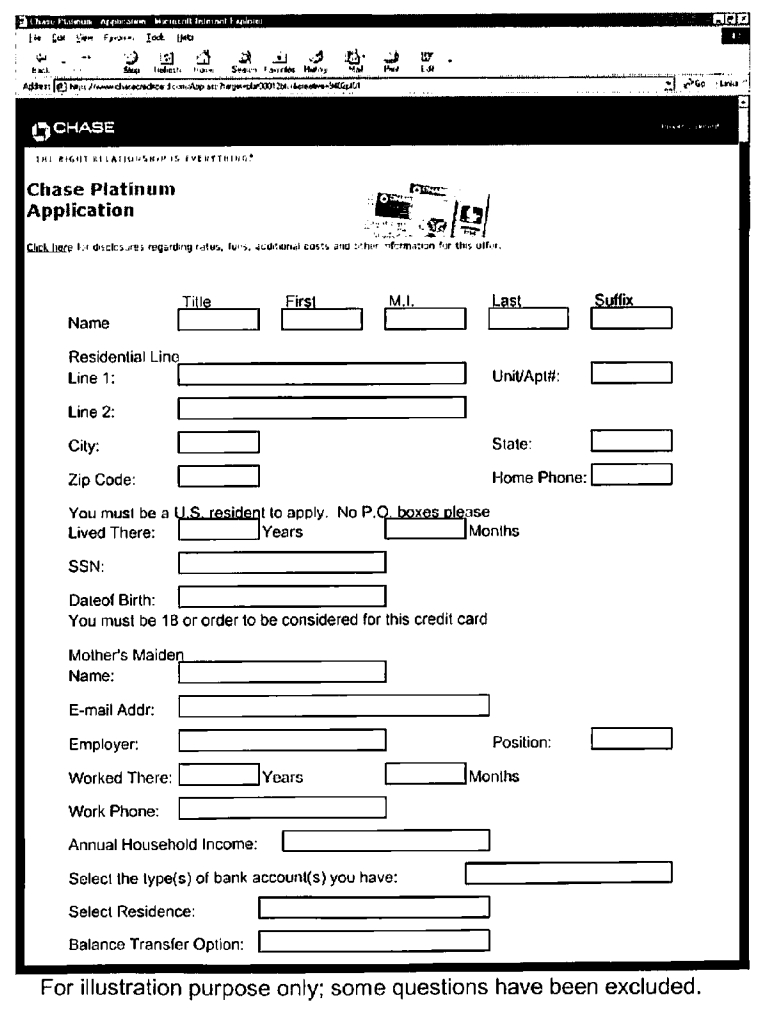

FIG. 4 is a diagram illustrating a customer's exemplary background questions in accordance with one embodiment of the present invention. The method of FIG. 2A is described in connection with FIG. 4 in order to set forth the method in a concrete fashion easily understood by the person of ordinary skills. However, this articulation of the method is exemplary only, and the method could be implemented using questions different from those of FIG. 4. The background data consists of, preferably but not limited to, personal information, demographic profiles, and financial information.

As set forth in step 212 of FIG. 2A, the customer answers the background questions and sends the answers back to the credit card issuer. When the background data is complete, the credit card issuer inquiries credit history data about this customer from the credit bureau 213. The credit bureau retrieves the credit history data about this customer from its database and transmits them to the credit card issuer 214. The credit card issuer evaluates the background data and the credit bureau data 215, and decides whether the customer is qualified for the credit card offer based on an established methodology 216. The qualification based upon applicant bureau data can also occur prior to or post the applicant providing answers to the methodology described herein using additional partner, product, or other traditional/non-traditional data sources.

As set forth in step 208, if the customer picks up the choice "Never had a credit card" or "less than 24 months" or "24~36 months", the credit card issuer will check whether the customer's background data from the partner is complete 217. If yes, the credit card issuer will use interactive questions and answers to ask the customer his/her background information, compare the partner-supplied data with the customer-supplied data, and thus validate the customer's background information 210. If the customer's background data from the partner is not complete, a pop-up will appear to ask the customer to provide the background data 218. The customer answers the background questions and sends the answers back to the credit card issuer 219. When the background data is complete, the credit card issuer inquiries credit history data about this customer from the credit bureau 220. The credit bureau retrieves the credit history data about this customer from its database and transmits them to the credit card issuer or third party vendor used for decision 221. The credit card issuer and/or vendor evaluates the background data and the credit bureau data 222, and decides which category the customer belongs to, i.e., either a customer with enough credit history data or a customer with limited or even no credit history data 223. If the customer belongs to one with enough credit history data, the credit card issuer decides whether the customer is qualified for the credit card offer based on the established methodology and the credit history data 216.

If the credit card issuer decides that the customer is qualified for the credit card offer, the credit card application is approved 224. If the credit card issuer decides that the customer is not qualified for the credit card offer, the qualification for the credit card offer will be considered together with the customer category with limited or even no credit history data.

For a customer with limited or even no credit history data, the credit card issuer will take into account the data supplied by the partner which could be his past transaction data with the partner (e.g., amounts of purchases, frequency of purchases, and types of purchases), and/or other data (e.g., credit accounts used), when he decides whether the customer is qualified for the credit card offer based on an established methodology which includes the partner-supplied data 225. If the customer is qualified for the credit card offer after considering the partner-supplied data, his credit card application will be approved 224. If the customer is still not qualified for the credit card offer after considering the partner-supplied data, the credit card issuer will interactively ask standard questions to obtain some important information about the customer 226. The exemplary standard questions are listed in FIG. 3A. As an example, the credit card issuer may ask: "What is the status of your employment?" As another example, "What is your average monthly savings in the past 12 months?" FIG. 3B lists additional standard questions which could be asked at this time.

During the interactive questions and answers, the partner-supplied data can be used as "truth serum" to detect whether the consumer is being truthful in his/her answers. For example, if the partner indicates that this customer has made past purchases on nine separate credit accounts but the customer selects "less than three", the issuer can deduce this customer is not being truthful, which will be included in the credit decision methodology.

As set forth in step 227, based on the answers given together with the background data and the credit history data, the credit card issuer will decides whether the customer is qualified for the credit card offer. If yes, the credit card application is approved 224. If not, the credit card issuer will ask additional questions about the experience with the partner to probe the customer's credit interests to make credit decision 228. The process may ask additional questions on approved accounts already on the approval path to determine for which future promotions the cardholder should be offered.

As set forth in step 224, for the customer whose credit card application is approved, the credit card issuer will ask additional questions about the experience with the partner to probe the customer's credit interests so that the credit card issuer could make an optimal product offer to the customer 229. The optimal product offer may include various incentives that might be given to the customer to induce acceptance. For example, it might include an offer for six months 0% balance transfers, frequent flyer miles, or other points/rewards/rebates. As another example, the customer may be given an incentive of $15 off Stephen King's latest novel if he/she signs up for the new account.

Figure 5C:
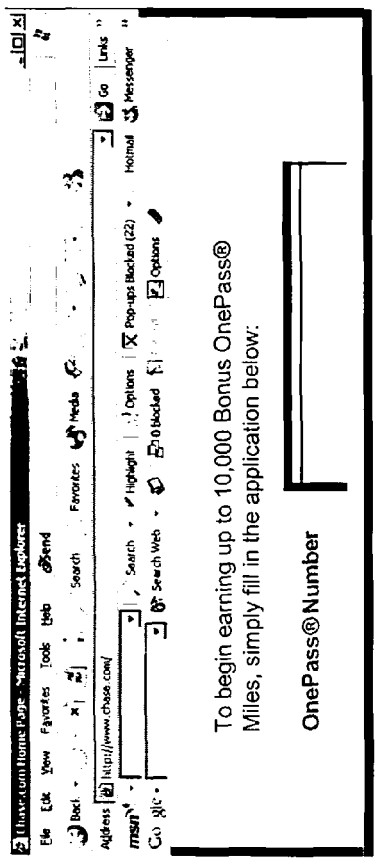

The exemplary additional questions are listed in FIGS. 5A~5C in accordance with one embodiment of the present invention. The method of FIG. 2C is described in connection with FIGS. 5A~5C in order to set forth the method in a concrete fashion easily understood by the person of ordinary skills. However, this articulation of the method is exemplary only, and the method could be implemented using questions different from those of FIGS. 5A~5C. FIG. 5A, FIG. 5B, and FIG. 5C show examples with Amazon.com, Disney, and Continental as a hypothetical partner of the credit card issuer respectively, the listed questions could be ones that the credit card issur may ask as additional questions.

Based on the answers given from the additional questions, the credit card issuer will decide whether the customer is qualified for the credit card offer based on the established methodology which takes into account the background data, the credit history data, the data from standard questions, and the data from additional questions 230. If yes, the credit application is approved 231. If not, the credit card application is declined 232.

The final step is to notify the customer the approval decision with the optimized product offer 233 or the decline decision 234. Further, if the approved customer is an existing cardholder of another credit card account, a pop-up may appear stating: "We note that you already have a credit account with us." Then the pop-up could ask the customer whether he/she wishes to (a) increase the limit on the old card; (b) transfer the balance on the old card onto the new card; and (c) accept a product more suited given the applicant input provided.

According to one approach, the above description could be a real-time interactive and partner-enhanced credit card application process. According to another approach, this interactive and partner-enhanced credit card application process could be one without a real-time link to the credit card issuer, i.e., the decision tree question/answer logic is predetermined. Again, the term decision tree should not limit the type of predictive modeling techniques used for question selection and presentation.

This online interactive and partner-enhanced credit card application process could relate the partner-supplied data and the data obtained through the interactive questions and answers to a bounty that a credit card issuer pays to a partner. A bounty is what the credit card issuer pays to the partner when a new credit account results from an on-line application. The bounty can be adjusted according to the value proposition of the customer at the time of offer, whether the customer is already a cardholder with the credit card issuer on another account (lower bounty in that case), and so forth. Using partner-supplied data can allow a more efficient determination of appropriate bounty, i.e., not just based on credit score. Additionally, if the credit card issuer determines that the partner-supplied data is not improving the credit decision, the credit card issuer can reduce the bounty paid to the partner. This will motivate the partner to provide better data, and thus benefit the credit issuer to make better decisions.

This online interactive and partner-enhanced credit card application process could also use the partner-supplied data or the data through interactive questions and answers to generate further revenue and ensure cardholder retention. Account rewards could be tailored to the customer's interests and purchase habits. For example, if Direct TV indicates that the customer watches a lot of HBO boxing, the credit account statement could include rewards/discounts for ShowTime boxing events. The credit card issuer could charge merchants and service providers for advertising their products/services through the credit card statement process. That advertising could be targeted based on the customer's habits as reflected based on the partner-supplied data or the data from the interactive questions and answers. The communication of promotions via statement should be used as an example to include all mediums in current and future use to which the cardholder has access to the statement or payment inquiry function.

During the online interactive and partner-enhanced card application process, the partner could also use the financial services data to help make better decisions on what products and services to offer the customer. The credit card issuer may indicate that the customer is a heavy telecom user, and the airline could offer some special promotions on telecom equipment and services at the customer's destination (e.g., calling cards, wireless internet connectivity). As an example, a partner makes a credit card offer to a customer. From the partner data, the credit card issuer identifies that the customer is already its credit card holder. The credit card issuer offers the customer to change his previous card to the current card or have multiple cards. In this case, the partner's bounty is not as big since the customer is already a card holder. Since the customer is already a card holder, the credit card issuer has the customer's profile on his buying habits, for instance the credit card issuer may know that the customer is an avid golfer and likes fine dining. The partner is advised of these preferences so that he can offer a product selection based on this additional knowledge. As another example, a credit card issuer offers a credit card to a new customer. Using the partner-supplied data, the credit card issuer arguments the application process. Based on the credit decision, the credit card issuer advises the partner on possible upgrades to the services or products that could be offered to the customer.

Although the present invention is exemplified in terms of computer-aided online credit card application, the present invention could also be applied by means of other media such as cell phone and e-book.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

The invention claimed is:

1. An automated method of facilitating credit decision in an online credit card application, comprising the steps of:
   a partner of a credit card issuer receiving an online purchase for at least one of a good and a service from a customer made using an online-accessible device;
   using the online-accessible device, the partner querying whether the customer is interested in applying for a credit card from the credit card issuer;
   the partner retrieving, from at least one computer database, partner-supplied data associated with the customer, including at least one of customer past transaction data with the partner and customer background data;
   the partner transmitting the partner-supplied data to the credit card issuer;
   the credit card issuer retrieving credit history data associated with the customer from a credit bureau;
   using the online-accessible device, the credit card issuer presenting interactive questions to the customer to receive additional customer data from the customer; and
   using a computer processor, the credit card issuer deciding whether to approve the customer for the credit card based on at least one of the partner-supplied data, the credit bureau-supplied credit history, and the additional customer data.

2. The method of claim 1, further comprising the step of:
   the credit card issuer determining an offer and at least one incentive for the customer based on at least one of the partner-supplied data, the credit bureau-supplied credit history, and the additional customer data; and
   using the online-accessible device, notifying the customer of the offer and the at least one incentive.

3. The method of claim 1, further comprising the step of:
   the credit card issuer determining an offer and at least one incentive for the customer based on at least one of the partner-supplied data, the credit bureau-supplied credit history, and the additional customer data;
   using the online-accessible device, notifying the customer of the offer and the at least one incentive;
   the credit card issuer determining at least one of customer interest-based account rewards and advertising for the customer based on at least one of the partner-supplied data, the credit bureau-supplied credit history, and the additional customer data; and
   using the online-accessible device, notifying the customer of the at least one of customer interest-based account rewards and advertising.

4. The method of claim 1, further comprising the step of:
   the credit card issuer determining a bounty for the partner based on at least one of the partner-supplied data, the credit bureau-supplied credit history, and the additional customer data.

5. The method of claim 1, wherein the additional customer data comprises customer past transaction data and customer background data, wherein the customer past transaction data includes at least one of amounts of purchases, frequency of purchases, and types of purchases; and
   wherein the customer background data includes at least one of personal information, a demographic profile, customer financial information, and customer credit account information.

6. The method of claim 1, wherein the partner-supplied data is used to verify the truthfulness of the customer's answers to the interactive questions.

7. The method of claim 1, wherein the interactive questions and answers are dynamic processes with a tree-type series of questions such that the each subsequent set of questions is based on the current answer, and the questions are prompted via statistical modeling techniques including at least one of logistic regression, neural networks, and genetic algorithms.

8. The method of claim 1, wherein the partner receives the online purchase on the partner's website.

9. The method of claim 1, wherein the online-accessible device is one of a computer, a POS terminal, a Kiosk, a cell phone, and a pocket PC.

10. An automated method of facilitating credit decision in an online interactive and partner-enhanced credit card application, comprising the steps of:
- using an online-accessible device, a credit card issuer initiating an online credit card application process with a customer of a partner of the credit card issuer;
- the credit card issuer receiving, from the partner, partner-supplied data associated with the customer, including at least one of customer past transaction data with the partner and customer background data;
- the credit card issuer receiving, from a credit bureau, credit history data associated with the customer;
- using the online-accessible device, the credit card issuer receiving, from the customer, additional customer data as answers to interactive questions; and
- using a computer processor, the credit card issuer determining whether to approve the customer for the credit card based on at least one of the partner-supplied data, the credit bureau-supplied credit history, and the additional customer data.

11. The method of claim 10, further comprising:
- the credit card issuer determining an offer and at least one incentive for the customer based on at least one of the partner-supplied data, the credit bureau-supplied credit history, and the additional customer data; and
- using the online-accessible device, notifying the customer of the offer and the at least one incentive.

12. The method of claim 10, further comprising:
- the credit card issuer determining an offer and at least one incentive for the customer based on at least one of the partner-supplied data, the credit bureau-supplied credit history, and the additional customer data;
- using the online-accessible device, notifying the customer of the offer and the at least one incentive; and
- the credit card issuer determining at least one of customer interest-based account rewards and advertising for the customer based on at least one of the partner-supplied data, the credit bureau-supplied credit history, and the additional customer data; and
- using the online-accessible device, notifying the customer of the at least one of customer interest-based account rewards and advertising.

13. The method of claim 10, further comprising the step of:
- the credit card issuer determining a bounty for the partner based on at least one of the partner-supplied data, the credit bureau-supplied credit history, and the additional customer data.

14. The method of claim 10, wherein the additional customer data comprises customer past transaction data and customer background data, wherein the customer past transaction data includes at least one of amounts of purchases, frequency of purchases, and types of purchases; and
- wherein the customer background data includes at least one of personal information, a demographic profile, customer financial information, and customer credit account information.

15. The method of claim 10, wherein the partner-supplied data is used to verify the truthfulness of the customer's answers to the interactive questions.

16. The method of claim 10, wherein the interactive questions and answers are dynamic processes with a tree-type series of questions such that the each subsequent set of questions is based on the current answer, and the questions are prompted via statistical modeling techniques including at least one of logistic regression, neural networks, and genetic algorithms.

17. The method of claim 10, wherein the partner receives the online purchase on the partner's website.

18. The method of claim 10, wherein the online-accessible device is one of a computer, a POS terminal, a Kiosk, a cell phone, and a pocket PC.

19. An automated method of facilitating credit decision in a realtime online interactive and partner-enhanced credit card application, comprising the steps of:
- using an online-accessible device, a partner of a credit card issuer receiving an online purchase from a customer for at least one of a good and a service;
- using the online-accessible device, the partner querying whether the customer is interested in applying for a credit card from the credit card issuer;
- the partner retrieving, from at least one computer database, partner-supplied data associated with the customer, including at least one of customer past transaction data with the partner and customer background data;
- the partner transmitting the partner-supplied data to the credit card issuer;
- the credit card issuer retrieving credit history data associated with the customer from a credit bureau;
- using the online-accessible device, the credit card issuer presenting interactive questions to the customer to receive additional customer data;
- using a computer processor, the credit card issuer deciding whether to approve the customer for the credit card based on at least one of the partner-supplied data, the credit bureau-supplied credit history, and the additional customer data;
- using the computer processor, the credit card issuer determining an offer and at least one incentive for the customer based on at least one of the partner-supplied data, the credit bureau-supplied credit history, and the additional customer data;
- using the online-accessible device, notifying the customer of the offer and the at least one incentive;
- using the computer processor, the credit card issuer determining at least one of customer interest-based account rewards and advertising for the customer based on at least one of the partner-supplied data, the credit bureau-supplied credit history, and the additional customer data;
- using the online-accessible device, notifying the customer of the at least one of customer interest-based account rewards and advertising;
- using the computer processor, the credit card issuer determining a bounty for the partner based on at least one of the partner-supplied data, the credit bureau-supplied credit history, and the additional customer data; and
- issuing the credit card to the customer;
- wherein the additional customer data comprises customer past transaction data and customer background data, wherein the customer past transaction data includes at least one of amounts of purchases, frequency of purchases, and types of purchases and wherein the customer background data includes at least one of personal information, a demographic profile, customer financial information, and customer credit account information;
- wherein the partner-supplied data is used to verify the truthfulness of the answers to the interactive questions;
- wherein the interactive questions and answers are dynamic processes with a tree-type series of questions such that the each subsequent set of questions is based on the current answer, and the questions are prompted via statistical modeling techniques including at least one of logistic regression, neural networks, and genetic algorithms; and wherein the online-accessible device is one of a computer, a POS terminal, a Kiosk, a cell phone, and a pocket PC.

20. The method of claim 1, further comprising the step of: issuing the credit card to the customer.

21. The method of claim 10, further comprising the step of: issuing the credit card to the customer.

22. An online interactive and partner-enhanced credit card application system for facilitating credit decision, comprising:

an online accessible device, wherein the online accessible device receives, from a customer, an online purchase for at least one of a good and a service from a partner of a credit card issuer, queries whether the customer is interested in applying for a credit card from the credit card issuer, and presents interactive questions to the customer to receive additional customer data;

a computer database that stores partner-supplied data associated with the customer, including at least one of customer past transaction data with the partner and customer background data; and a processor that receives the partner-supplied data and determines whether to approve the customer for the credit card based on at least one of the partner-supplied data, a credit history retrieved from a credit bureau, and the additional customer data;

wherein the online-accessible device is one of a computer, a POS terminal, a Kiosk, a cell phone, and a pocket PC.

23. The system of claim 22, wherein the processor further determines an offer and at least one incentive for the customer based on at least one of the partner-supplied data, the credit bureau-supplied credit history, and the additional customer data.

24. The system of claim 22, wherein the processor further determines at least one of customer interest-based account rewards and advertising for the customer based on at least one of the partner-supplied data, the credit bureau-supplied credit history, and the additional customer data.

25. The system of claim 22, wherein the processor further determines a bounty for the partner based on at least one of the partner-supplied data, the credit bureau-supplied credit history, and the additional customer data.

* * * * *

UNITED STATES PATENT AND TRADEMARK OFFICE
CERTIFICATE OF CORRECTION

| | | |
|---|---|---|
| PATENT NO. | : 8,489,497 B1 | Page 1 of 1 |
| APPLICATION NO. | : 11/275777 | |
| DATED | : July 16, 2013 | |
| INVENTOR(S) | : Novak et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1376 days.

Signed and Sealed this
Seventeenth Day of February, 2015

Michelle K. Lee
*Deputy Director of the United States Patent and Trademark Office*